United States Patent [19]

Sproull et al.

[11] Patent Number: 4,485,472
[45] Date of Patent: Nov. 27, 1984

[54] TESTABLE INTERFACE CIRCUIT

[75] Inventors: Robert Sproull; Edward H. Frank, both of Pittsburgh, Pa.

[73] Assignee: Carnegie-Mellon University, Pittsburgh, Pa.

[21] Appl. No.: 373,648

[22] Filed: Apr. 30, 1982

[51] Int. Cl.³ ............................................ G06F 11/00
[52] U.S. Cl. ................................ 371/15; 324/73 AT; 371/18
[58] Field of Search ............................ 371/15, 16, 18; 324/73 AT, 73 R; 364/580

[56] References Cited

U.S. PATENT DOCUMENTS

| | | | |
|---|---|---|---|
| 3,814,919 | 6/1974 | Repton et al. | 371/16 |
| 3,908,117 | 9/1975 | Naruse et al. | 371/18 |
| 4,167,780 | 9/1979 | Hayashi | 371/18 |
| 4,357,703 | 11/1982 | Van Brunt | 371/15 |
| 4,403,287 | 9/1983 | Blahut et al. | 371/16 |
| 4,410,984 | 10/1983 | Negi et al. | 371/16 |

OTHER PUBLICATIONS

Eichelberger, E. B. and Williams, T. W., "A Logic Design Structure for LSI Testability," Journal of Design Automation and Fault-Tolerant Computing 2(2):165–178, May 1978.
Frank, E. H. and Sproull, R. F., "Testing and Debugging Custom Integrated Circuits," CMU-CS-81-105, Computer Science Department, Carnegie-Mellon University, Feb. 1981.
Frank, E. H. and Sproull, R. F., "Two Timing Samplers," Proc. 1981 Caltech VLSI Conference, Jan. 1981.
Grason, J., and Nagle, A. W., "Digital Test Generation and Design for Testability," Proc. 1980 Design Automation Conference, Jun. 1980, pp. 175–189.
Hsu, F., et al., "Selective Controllability: A Proposal for Testing and Diagnosis," Proc. 1978 Semiconductor Test Conference, Oct.1978, pp. 170–175.
Sutherland, I. E., Molnar, C. E., Sproull, R. F. and Mudge, J. C., "The Trimosbus," Proc. 1979 Caltech Conference on VLSI, pp. 395–427, Jan. 1979.

*Primary Examiner*—Jerry Smith
*Assistant Examiner*—Mark Ungerman
*Attorney, Agent, or Firm*—Buell, Blenko, Ziesenheim & Beck

[57] ABSTRACT

The interface circuit is intended to be connected between a module terminal and a module itself and provides means for stimulating and sensing signals between the module and its terminal. The interface circuit comprises a decoupling section which connects or disconnects the interface circuit from the module, a test data section for receiving test data from outside sources, an inside section which connects the test data section with the interior of the module and an outside section which connects it with the terminal. A monitor section is also included to allow a terminal to be monitored while it is connected to from its module. The control section requires only four connections and generates the various control signals necessary to control the operation of the interface circuit.

17 Claims, 2 Drawing Figures

TESTABLE INTERFACE CIRCUIT

This invention was supported by the Defense Advanced Research Projects Agency, Department of Defense, ARPA Order 3597, monitored by the Air Force Avionics Laboratory under contract F33615-78-C-1551.

This invention relates to apparatus for testing components of digital systems. It is more particularly concerned with such apparatus which may be made a part of a digital module at its interface with other modules.

BACKGROUND OF THE INVENTION

Testing and debugging integrated circuits and other complex digital electronics is a persistent problem. There are two parts to the problem: first, gaining access to the signals in the circuit in order to stimulate the circuit in many different ways and measure its response, and second, devising a set of test stimulations that thoroughly exercises the circuit. This invention addresses the first problem: it discloses a novel scheme for providing access to signals on intergrated-circuit chips, boards, or any other collection of digital electronics.

Large digital systems are constructed by joining together smaller systems using interfaces. Most often, an interface is evident in the physical construction of the system. For example, an integrated circuit chip has as its interface its pins 16, 18, 24, 48, or more connections by which the integrated circuit is connected into a larger assembly. Similarly, a printed-circuit board has as its interface an edge connector to plug into a backplane; it may also have additional connectors mounted elsewhere on the board to accept connection cables. Many interfaces are not so obvious however. Within an intergrated-circuit chip, there are often interfaces. For example, a microprocessor will have distinct sections for the Arithmetic Logic Unit (ALU), a sequencer, and a memory interface among many others. A distinct interface exists between the ALU and the sequencer, consisting of control signals that the sequencer will use to govern the operation of the ALU and signals generated as the result of ALU operators that will govern the subsequent operation of the sequencer. In general, a signal at the interface may be bidirectional.

A convenient way to debug and test a digital subsystem is to stimulate and observe signals at the subsystem's interface. Thus, for example, a chip is plugged into a "chip tester" or a printed-circuit board into a "board tester" to carry out the tests. Each signal at the interface is connected to a testing device so that it may be stimulated or observed. A significant disadvantage of testers built this way is the considerable number of connectors and signal stimulation and measurement electronics required.

SUMMARY OF THE INVENTION

We build into each subsystem sufficient electronics to enable its interface to be disconnected and tested using a small number of connections to a testing device. A small interface circuit is associated with each interface signal. The interface circuit controls whether or not the interface signal is disconnected and can stimulate or sense signals on either side of the interface. The interface circuits themselves are controlled by data passed through a shift register that threads through all interface circuits in the entire system. In our invention only four connections are required (in addition to power and ground) in order to perform a number of tests on any subsystem.

During normal operation of the subsystems, all of the interface switches are closed, and signals pass with little or no delay. In this case, the interface is said to be operating. The interface circuits can perform two useful services when the interface is operating:

1. If the system is stopped, say because an error has occurred or because a design engineer is "single-stepping" the system, the state of each interface signal can be latched in the control circuit and then shifted out to be analyzed by a tester or for presentation to an engineer. This is a valuable debugging and diagnostic tool.

2. While the system is operating, the circuits can monitor the behavior of an arbitrary interface signal in the system. This is done by setting up all interface circuits but one to simply pass the shift register inputs to outputs, but setting up one circuit to insert into the shift chain the current state of its interface signal. The shift register output, which is routed to the tester, will contain a continuous stream of values observed on that one interface signal, although the information may be delayed substantially because it is shifted through a large number of interface circuits before it reaches the tester. This facility can be used to monitor a signal for some rarely-occurring condition, or to perform a large number of performance analyses.

In order to test a subsystem by itself, the interface switches are opened, and the subsystem is said to be isolated. Now the interface circuits are used to stimulate and sense signals associated with a particular subsystem. The stimulations are provided by an external tester, but are presented to the interface signals using the interface circuit. Likewise, the results are sensed by the interface circuits, and analyzed by the external tester. This approach to testing and debugging offers a number of advantages:

1. The subsystem can be tested at any time without plugging it into a special test jig or disconnecting it from the larger assembly of which it is a part. For example, the ALU of a chip can be tested independent of the rest of the sections of the chip; an entire chip or PC board can be tested without unplugging it.

2. All subsystems use a common interface to the testing device: four connections (not counting power and ground) suffice. These four connections can be provided with a standard connection geometry. On a printed-circuit board, they might be brought to a connector accessible on the edge of the board; this connection would have a standard geometry irrespective of the number of pins on the board's backplane connector; irrespective of the size of the board, etc. On an integrated circuit chip, the connections would be brought to "pads" arranged in a standard geometry accessible to a probe-station. In this way, a standard probe-station could be used to test chipterface is standard.

3. The precision of the test is controlled by the kind of interface circuits provided. For functional testing, the interface circuit will be simple, although it can still provide sufficiently accurate timing information to be the basis for sorting integrated circuits based on their performance. The detailed design described hereinafter shows how timing accuracy can be provided.

4. The circuitry for testing interfaces is designed in such a way that one tester can test all the interfaces in a large system. This is because an arbitrary number of interface circuits can be connected in series on the shift register. Thus, for example, if a chip has 14 internal interfaces among its various sections, all 14 interfaces can be tested with just the four-wire connection. Similarly, an arbitrarily large printed-circuit board can allow the interfaces to all of the chips mounted on the board to be tested with only four connections.

The shift register used to control the interface circuits can also be routed through the subsystems themselves for various purposes, such as configuration or initialization. For example, memory subsystems of identical design might be configured during initialization to recognize distinct address ranges. Also, if an error occurs, a subsystem might place on the shift register some data that helps track down the cause of the error. Although both of these samples can be accomplished by making the appropriate signals available at an interface and using the interface circuits to sense or stimulate them, it may be more natural to embed these signals within a subsystem.

An important use of the interface circuits is testing interconnections. A subsystem may simply be interconnection wiring, not containing any active circuits. If this subsystem is isolated, the interface circuits can then determine that the interconnection pattern is proper by stimulating each net in turn, and checking to see which interface signals follow the stimulation. This is a major advantage, since bonding wires, IC sockets, printed-circuit boards, edge connectors, and backplanes are all significant sources of circuit faults. Interface circuits on each chip in a system would be able to verify completely the system's interconnect.

Although interface circuits may be sufficiently complex that it is uneconomical to place them at interfaces to very small subsystems, they can be placed at the major physical boundaries in digital circuits: the interfaces to a chip at its pins, and the interfaces to a board at its pins.

Interface circuits may be easily incorporated into each pad driver in an integrated circuit, only doubling the area required for the driver. This design would also allow existing chips to be retro-fitted with interface circuits, since pad drivers are habitually located on the perimeter of the chip design, where additions can be made easily.

Interface circuits have considerable utility even if only a portion of a system is fitted with them. For example, imagine a small microprocessor system and its associated memory. Suppose that only the microprocessor chip has interface circuits on its pad drivers. These circuits allow the microprocessor to be tested, but they also allow the function of the memory system to be tested. Our invention is thus suited for systems that contain a mixture of part types, some of which have no provision for testability, and some of which have our four-wire testing interface.

As will appear the interface circuit of our invention requires eight external control signals in addition to input and output terminals for externally generating test data. That data and the terminals therefor are sometimes referred to hereinafter as scan in and scan out. Where plenty of terminals are available on printed-circuit boards, for example, a total of ten terminals may not be prohibitive. When the modules are integrated circuits, however, such a number of terminals is generally prohibitive. We have invented a control circuit for our interface circuit which requires a total of only four terminals, two control terminals in addition to scan in and out terminals and generates internally from the signals on those four terminals the eight control signals required for our interface circuit.

DESCRIPTION OF PREFERRED INTERFACE CIRCUIT EMBODIMENT

Figure 1:
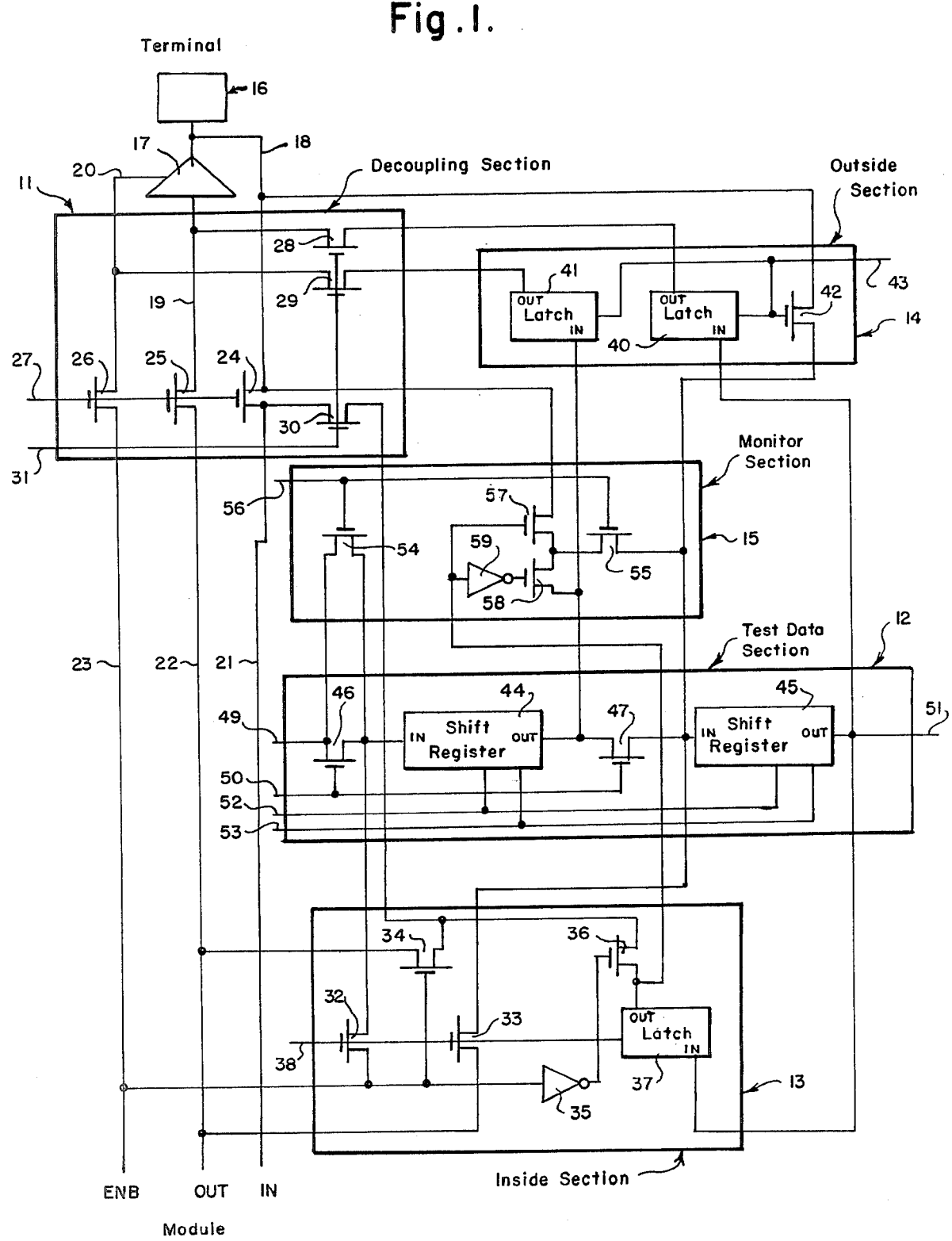
FIG. 1 is a circuit diagram of our interface circuit.

As is shown in FIG. 1 our apparatus comprises five sections; a decoupling section 11, a test data section 12, an inside section 13, an outside section 14, and a monitor section 15. A pad or terminal 16 is normally driven by a driver 17. The leads from the driver-terminal combination which connect with the module of which it is a part are in lead 18, which transmits data from the terminal to the module, out lead 19 which transmits data from the module to the driver 17, and enable lead 20 which transmits data from the module which controls the driver 17, that is to say switches it from active to inactive condition. Decoupling section 11 is connected between leads 18, 19 and 20 above mentioned and the corresponding leads of the module 21, 22 and 23, respectively. Lead 18 is connected to lead 21 through switching transistor 24, lead 19 to lead 22 through switching transistor 25 and lead 20 to lead 23 through switching transistor 26. The gates of all three transistors above mentioned are connected together and to external control lead 27. Lead 19 is also connected to one terminal of switching transistor 28, lead 20 is connected to one terminal of switching transistor 29 and lead 21 is connected to one terminal of switching transistor 30. The gates of all three transistors 28, 29 and 30 are connected together and to external control lead 31. The other terminal of transistor 30 is connected to a terminal of switching transistor 34 in the inside section to be described, and the other terminals of transistors 28 and 29 are connected to the outputs of latches 40 and 41 respectively, of the outside section, also to be described hereinafter.

Module lead 22 is connected to the other terminal of switching transistor 34 in inside section 13. Module lead 22 is also connected to one terminal of switching transistor 33, the other terminal of which is connected to the input of shift register 45 in test data section 12 to be described. The other terminal of switching transistor 34 is also connected through switching transistor 36 to the output of latch 37. Module lead 23 is connected to one terminal of externally controlled switching transistor 32, to the gate of switching transistor 34 and, through inverter 35, to the gate of switching transistor 36. The other terminal of switching transistor 32 is connected to the input of shift register 44 in test data section 12, to be described hereinafter. The gates of switching transistors 32, 33 and the control terminal of latch 37 are tied together and to external control lead 38.

In outside section 14 the inputs of latches 41 and 40 are connected to the outputs of shift registers 44 and 45 respectively of the test data section 21, to be described hereinafter. Terminal in lead 18 is connected to one terminal of switching transistor 42, the other terminal of which is connected to the input of shift register 45 in test data section 12. The control terminals of latches 40 and 41 are tied to the gate of switching transistor 42 and to external control lead 43.

The test data section 12 comprises first one-bit shift register 44 and second one-bit shift register 45 connected in tandem by switching transistor 47. The input of shift register 44 is connected to external data or scan in lead 49 by switching transistor 46. The gates of transistors 46 and 47 are tied together and to external control lead 50. The output of shift register 45 is connected to external data or scan out lead 51. External clock signal leads 52 and 53 are connected to both shift registers 44 and 45.

Monitor section 15 is connected to the input of shift register 45 through switching transistor 55. The other terminal of that transistor is connected through switching transistor 58 to the input of latch 41 in outside section 14 and the output of shift register 44 in test data section 12. The gate of transistor 55 is connected to external control lead 56. The junction of transistors 55 and 58 is connected through switching transistor 57 to in lead 18 of terminal 16. The output of latch 37 in inside section 13 is connected to the gate of transistor 57 and through inverter 59 to the gate of transistor 58. External control lead 56 is also connected to the gate of switching transistor 54 which bridges transistor 46 in test data section 12.

The operation of our interface circuit above described will be detailed section by section. The decoupling section 11 determines whether the module's signals are to be connected directly to the terminal 16 or to our interface circuit. If control voltage is applied to external control lead 27 transistors 24, 25 and 26 conduct and so connect leads 18 to 21, 19 to 22 and 20 to 23. No control voltage is applied to transistors 28, 29 and 30 and they are non-conducting, so that leads 19 and 20 are disconnected from outside section 14 and lead 21 is disconnected from inside section 13. Under those conditions our interface circuit has no effect on the module and the terminal to which it is attached.

When control voltage is applied to control lead 31 but not to control lead 27 transistors 24, 25 and 26 do not conduct but transistors 28, 29 and 30 conduct. In this mode the module is isolated from its terminal 16 and the signals presented to the terminal and the module are controlled by the remaining sections of our interface circuit.

The inside section 13 provides the ability to test the module when it is isolated from terminal 16. Inside section 13 is active when the decoupling section 11 is active and control voltage is applied to control lead 38. In this mode the data on leads 23 and 22 are allowed to pass through transistors 32 and 33 respectively so that on the next clock cycle the data on leads 23 and 22 will be stored in the test data section in shift registers 44 and 45 respectively. The data presented on lead 21 comes from one of two sources. If control voltage is applied to enable lead 23 then the data on lead 21 comes from lead 22 via transistors 34 and 30. However, if no control voltage is applied to enable lead 23 then the data on lead 21 comes from the output of latch 37 via transistors 36 and 30. This treatment of the in signal on lead 21 is required in order to mimic the operation of the tristate terminal driver 17 when the decoupling section 11 is active. Latch 37 is loaded from test data section 12 whenever lead 38 carries control voltage. Therefor, the proper operation of inside section 13 is to load the proper data into test data section 12 and then activate and deactivate control lead 38. Latch 37 is important when it is desired to test signals that may not vary arbitrarily (e.g., clocks, or self-timed signals), since it allows data in test data section 12 to change without affecting the data seen by the module on in signal lead 21.

The outside section provides the ability to test the parts of a system that are connected to a particular terminal i.e., those parts of a system that are outside of a particular module. Outside section 14 provides capability to examine the state of terminal 16 or to place data onto that terminal. Outside section 14 is active when decoupling section 11 is active and control lead 43 is activated by a control voltage. In this mode the data from terminal 16 on lead 18 is passed through transistor 42 and is stored in test data section 12 on the next clock cycle, which is applied through control leads 52 and 53. Moreover, enable lead 20 and out lead 19 are driven via transistors 29 and 28 using the data previously stored in test data section 12. This data is also stored in latches 41 and 40. Those latches are of the flow-through type so that when lead 43 is activated the data stored in test data section 12 passes through latch 41 and latch 40 and is presented on enable lead 20 and out lead 19 respectively. When control lead 43 is deactivated this data is then stored in latches 41 and 40. As in the inside section these latches allow the data in test data section 12 to be changed without affecting the data on leads 19 and 20. A complete outside section cycle first consists of loading the proper data into the test data section and then activating and deactivating control lead 43.

Monitor section 15 provides for a special monitoring mode that allows a single terminal to be monitored while the decoupling section 11 is inactive. If control lead 56 is activated by control voltage then transistor 55 conducts and the signal from latch 37 is used to determine whether or not the in signal on lead 18 is latched into the test data section 12 on the next clock cycle. If latch 37 so signals then the signal on lead 18 is passed through transistor 57 and is latched in test section 12. If latch 37 does not so signal then the signal on lead 18 is not passed. The signal from latch 37 is loaded using the signal on control lead 38 as described for the inside section 13. The control signal on lead 56 also controls how the shift register chain is formed. If a signal is applied to lead 56, then transistors 54 and 55 conduct. Then if latch 37 does not provide an activating voltage the normal shift register chain is formed through transistor 58. However, if a signal is received from latch 37 the shift register chain is broken and data from lead 18 is inserted into the chain as previously mentioned.

Test data section 12 is used to store test data destined for and received from inside section 13, outside section 14 and monitor section 15, and to communicate this data to and from the other interface circuits and other test structures. The key features of section 12 are that it can receive bits of data from circuits outside of the interface circuits, provide this data to the inside, outside and monitor sections, store data received from those three sections, and finally transmit this new data to other circuits outside our interface circuit. All test data sections 12 are wired with the output 51 of one test data section wired to the input 49 of the next test data section in order to form a large shift register. To load the test data section with the appropriate data a control voltage must be applied to lead 50. This signal allows data to pass through transistors 46 and 47, thereby connecting the output of each individual one-bit shift register to the input of the next register in the chain. Data on the input of shift register 44 is shifted through one stage by operating the clock signals on leads 52 and 53 in a non-overlapping fashion (i.e., first lead 52 is activated and deactivated and then lead 53 is activated and then deactivated). Each test data section 12 stores two bits of information. Once the data has been shifted into test data section 12 control lead 50 is deactivated before performing tests using the inside, outside or monitor sections to deactivate transistors 46 and 47. Once a test has been performed (i.e., control lead 38 or 43 has been activated or deactivated), a single clock cycle is performed and then control lead 50 is activated once again in order that test data may be shifted out of the test data section. When the monitor section 15 is in use external control lead 50 is kept inactive as control lead 56 is activated to create the proper shift register chain.

DESCRIPTION OF PREFERRED CONTROL CIRCUIT EMBODIMENT

Figure 2:
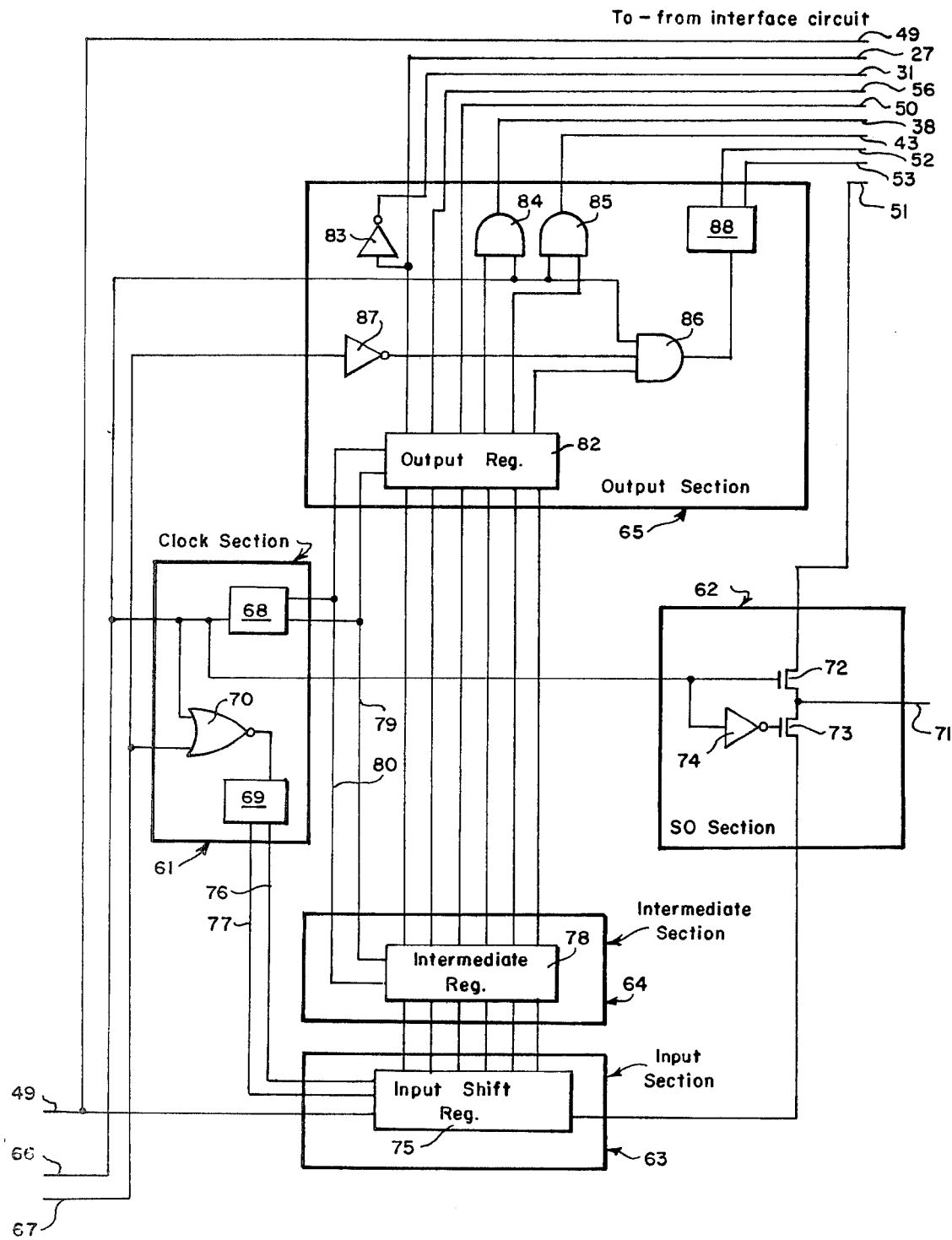
FIG. 2 is a circuit diagram of our control circuit for our interface circuit.

Our control circuit, shown in FIG. 2, comprises five sections: a clock section 61, a scan out section 62, an input section 63, an intermediate section 64, and an output section 65. The circuit requires only four external terminals or connections, one of which is existing data or scan in terminal 49 of our interface circuit previously described herein. The other three terminals are control terminals 66, 67 and 71 to be described.

Clock section 61 is used to generate clock signals for loading data into the registers in the other sections of the controller. A control signal terminal 66 is connected to the input of two-phase clock generator 68 and one input of nor gate 70. Control terminal 67 is connected to the other input of nor gate 70 and the output of that gate is connected to the input of two-phase clock generator 69.

Scan out section 62 determines whether the controller or the interface circuit drives the scan out terminal 71. The gate of switching transistor 72 is connected to control terminal 66 and the gate of switching transistor 73 is also connected to terminal 66 through inverter 74. Like terminals of transistors 72 and 73 are connected together and to scan out terminal 71. The other terminal of transistor 72 is connected to lead 51 of the interface circuit and the other terminal of transistor 73 is connected to input section 63 to be described.

Input section 63 comprises a series in-parallel out shift register 75. Its input is connected to terminal 49 and it is controlled by clock generator 69 through leads 76 and 77. Its series output is connected to the other terminal of switching transistor 73 previously mentioned.

Intermediate section 64 comprises a parallel in-parallel out register 78. Its inputs are connected to the outputs of shift register 75 respectively and it is controlled by clock generator 66 through leads 79 and 80.

Output section 65 comprises a parallel in-parallel out register 82 with its inputs connected to the outputs of shift register 78 respectively. It is controlled by clock generator 68 through leads 79 and 80. The first output of register 82 is connected to lead 27 of our interface circuit described herein. The first output of register 82 is also connected to lead 31 of our interface circuit through inverter 83. The second output of register 82 is connected to lead 56 of our interface circuit. The third output of register 82 is connected to lead 50 of our interface circuit. The fourth output of register 82 is connected to one input of and gate 84. The fifth output of register 82 is connected to one input of and gate 85. The other inputs of those gates are connected together and to control terminal 66. The output of and gate 84 is connected to lead 38 of our interface circuit. The output of and gate 85 is connected to lead 43 of our interface circuit. The sixth output of register 82 is connected to one input of three input and gate 86. The common inputs of and gates 84 and 85 are connected to another input of and gate 86. The remaining input of and gate 86 is connected through inverter 87 to control terminal 67. The output of and gates 86 drives two-phase clock generator 88, the outputs of which are connected to leads 52 and 53 of our interface circuit.

In the operation of our control circuit the control signal terminals 66 and 67 are connected to all controllers in the assembly. Scan in terminal 49 is connected to the output terminal of a preceeding controller and scan out terminal 71 is connected to the input terminal of a succeeding controller. It will be observed that these latter terminals are shared with the interface circuit being controlled.

Signals are not applied to terminals 66 and 67 simultaneously. The control circuit is arranged so that when there is no signal applied to control terminal 66 data is shifted into the input section 63 via the signal on terminal 49 using the signal on terminal 67 to actuate clock generator 69. Each time a signal is applied to control terminal 66 data is copied from intermediate section 64 into output section 65 and from input section 63 into intermediate section 64.

Output section 65 uses the data from intermediate section 64 together with signals from control terminals 66 and 67 to generate the appropriate signals for driving our interface circuit.

Clock section 61 generates the proper clock signals for loading data into the shift registers in the input, intermediate and output sections of our controller. Registers 78 and 82 are clocked by the signal transitions on control terminal 66. The signals on that terminal drive clock generator 68, the two outputs of which clock registers 78 and 82. Clock signals for shift register 75 are generated by clock generator 69 the input to which is the "nor" from nor gate 70 of signals on terminals 66 and 67.

In scan out section 62, if no signal is placed on terminal 66 the input shift register 75 is gated via inverter 74 by transistor 73 on to terminal 71 of the controller. Shift register 75 is shifted only when no signal appears on control terminal 66. When a signal is applied to that terminal signals received from the interface circuit on lead 51 are gated into terminal 71 via transistor 72.

Data for the control circuit is placed on control terminal 49 and when no signal is applied to control terminal 66 signal transitions on terminal 67 cause this data to be shifted into shift register 75. When the transfer of this data is completed a signal is applied to control terminal 66. This activates clock generators 68 and 69 successively and causes data to be copied from register 78 into register 82, and from register 75 into register 78.

The intermediate section 64 comprises merely the parallel in-parallel out register 78. When a signal is applied the control terminal 66 data from input section 63 is copied into intermediate section 64 as is mentioned above.

As has been mentioned, the first three outputs of output register 82 supply signals to interface circuit leads 49, 27, 31 and 56, the signal to lead 31 being derived from the signal to lead 27 through inverter 83. The fourth and fifth outputs are "anded" with the signal on control terminal 66 in and gates 84 and 85 respectively and applied to interface circuit leads 38 and 43 respectively. Signals for interface circuit leads 52 and 53 are generated by clock generator 86 controlled by the sixth output of the output register, which is an enabling signal "anded" with signals from control terminal 66 and control terminal 67 through inverter 87. The above arrangement insures that the signal on control terminal 66 provides the mechanism for controlling exactly when signals are applied to interface circuit leads 38 and 43 and that a signal is applied to lead 52 when a signal is applied to control terminal 66 at the same time an enabling signal is transferred by the output shift register 82 and no signal appears on the control terminal 67.

Our control circuit may dispense with the intermediate circuit but that circuit allows two sets of control data to be loaded into the controller before actually starting a test sequence. This extra section is useful because of the dynamic storage that is used in the test data section of the interface circuit. The use of an extra register in the controller makes it possible to apply quickly two different sets of control signals to the interface circuit by successively applying a signal and removing it from control terminal 66.

While we have shown and described a present preferred embodiment of the invention and have illustrated a present preferred method of practicing the same, it is to be distinctly understood that the invention is not limited thereto but may be otherwise variously embodied within the scope of the following claims.

We claim:

1. An interface testing circuit for connection between a terminal and a module of a digital system, comprising a decoupling section, a test data section, and one or more of the following sections; an inside section, an outside section and a monitoring section, the decoupling section comprising means, in a first state, for connecting the module to the terminal and in a second state, for connecting the interface circuit to the terminal and module, the test data section comprising means for storing test data destined for and received from the inside, outside, and monitor sections, or any one of them, means for connecting the storage means with those sections, and means for transmitting test data to and from external interface circuits and external test structures, the inside section comprising means for routing data stored in the test data section to the module, and routing data from the module to the test data section, the outside section comprising means for routing data from the terminal into the test data section and for routing data from the test data section into the terminal, and the monitor section comprising means for monitoring the terminal while it is connected to the module.

2. The interface testing circuit of claim 1 in which the terminal is driven by a driver having in, out and enable leads which connect to corresponding leads of the module.

3. The interface testing circuit of claim 2 in which the storage means in the test data section comprises two one-bit shift registers, an external data input connected to the first register input by first externally controlled interruptable means, and second externally controlled interruptable means connecting the two shift registers in tandem, both said means being controlled by the same control signal.

4. The interface testing circuit of claim 3 in which the inside section means for routing data stored in the test data section to the module comprise a first latch, means connecting the output of the second shift register to the first latch input and means connecting the first latch output to the module in lead, and the means for routing data from the module to the test data section comprise means connecting the module enable lead to input of the first shift register through third controlled interruptable means and means connecting the module out lead to the second shift register input through fourth controlled interruptable means, both said means and the latch being controlled by the same external signal.

5. The interface testing circuit of claim 4 in which the monitoring section comprises means for monitoring the terminal while it is connected to the module comprising sixth controlled interruptable means connecting the terminal with the input of the second shift register through seventh controlled interruptable means, the sixth controlled interruptable means being controlled by the output of the first latch and the seventh controlled interruptable means being controlled by an external signal.

6. The interface testing circuit of claim 5 in which the output of the first shift register is connected through eighth controlled interruptable means with the seventh controlled interruptable means, the eighth interruptable means being controlled through an inverter by the output of the first latch.

7. The interface testing circuit of claim 5 in which the monitoring section includes ninth controlled interruptable means bridging the first controlled interruptable means, and means connecting the control of the ninth controlled interruptable means with the control of the seventh controlled interruptable means.

8. The interface circuit of claim 3 in which the outside section means for routing the data from the terminal into the test data section comprise fifth externally controlled interruptable means connecting the terminal with the input of the second shift register, and the means for routing the data from the test data section into the terminal comprise a second latch, means connecting the output of the first shift register to the second latch input, means connecting the second latch output to the enable lead of the driver, a third latch, means connecting the output of the second shift register to the third latch input, and means connecting the output of the third latch to the driver input, both latches and the fifth control interruptable means being controlled by the same signal.

9. Apparatus of claim 1 including control apparatus therefor comprising a clock section, a scan out section, an input section, and an output section, the clock section comprising means for generating two-phase clock signals, said generating means being controlled by first and second control signals, the scan out section comprising gating means controlled by the first control signal means to determine whether the control apparatus or the interface circuit drives the scan out terminal, the input section comprising data storage means controlled by said clock signals for receiving data from a third control signal, and the output section comprising data storage means controlled by said clock signals for receiving data from the input section, and means for combining said data with said first and second control signals to supply signals required for controlling the interface circuit.

10. Apparatus of claim 9 including an intermediate section connected between the input section and the output section, the intermediate section comprising data storage means controlled by said clock signals for receiving data from the input section and transmitting it to the output section.

11. Apparatus of claim 10 in which the intermediate section data storage means comprise a parallel in-parallel out register and including means connecting the parallel outputs of the intermediate section register to the parallel inputs of the output section data storage means.

12. Apparatus of claim 10 in which the data storage means of the output section comprise a parallel in-parallel out register, three inputs of which are connected to the leads of the control apparatus for the decoupling, monitoring and scan out of the test data section, respectively, of the interface circuit.

13. Apparatus of claim 10 in which the data storage means of the output section comprise a parallel in-parallel out register and the means for combining data from the output section data storage means with said first and second control signals comprise first and second and gates having a common terminal connected to the first control signal, means connecting the other terminal of each gate to a separate terminal of the output section register, and means connecting outputs of the first and second gates to the data storage means of the inside section and outside section respectively of the interface testing circuit.

14. The apparatus of claim 10 in which the data storage means of the output section comprise a parallel in-parallel out register and the means for combining data from the output section data storage means with said first and second control signals comprise a three-input and gate, means connecting one said input to said first control signal terminal, means connecting a second input through an inverter to said second control signal terminal, means connecting a third said input to a terminal of the output section register, means connecting the output of the and gate to a third two-phase clock generator, and means connecting the outputs of said generator to the storage means of the test data section of the interface testing circuit.

15. Apparatus of claim 9 in which the clock section means for generating two-phase clock signals comprise a first two-phase clock generator, a second two-phase clock generator, and a nor gate, means for applying the first control section signal to the control terminal of the first two-phase clock generator and to one input of the nor gate, means for applying the second control section signal to the other input of the nor gate, means connecting the output of the nor gate to the control terminal of the second two-phase clock generator, means connecting the outputs of the first two-phase clock generator to the clock terminals of the output data storage means, and means for connecting the outputs of the second two-phase clock generator to the clock inputs of the input data storage means.

16. Apparatus of claim 9 in which the scan out section comprises two transistors having like terminals connected together, means connecting that junction with the scan out terminal, means connecting the other terminal of the first transistor to the scan out terminal of the interface circuit, means connecting the other terminal of the second transistor to the scan out terminal of the input section storage means, means connecting the gate of the first transistor to the first control terminal and means connecting the gate of the second transistor to the first control terminal through an inverter.

17. Apparatus of claim 9 in which the input section data storage means comprise a series in-parallel out shift register and including means connecting the series output of the input shift register to the scan out terminal and means connecting the parallel outputs of the first input section shift register to the inputs of the output section data storage means.

* * * * *

UNITED STATES PATENT AND TRADEMARK OFFICE
CERTIFICATE OF CORRECTION

PATENT NO. : 4,485,472

DATED : November 27, 1984

INVENTOR(S) : Robert Sproull; Edward H. Frank

It is certified that error appears in the above-identified patent and that said Letters Patent is hereby corrected as shown below:

Column 4, line 59, "21" should read -- 12 --.

Signed and Sealed this

Fourth Day of June 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,485,472
DATED : November 27, 1984
INVENTOR(S) : Robert Sproull et al.

It is certified that error appears in the above-identified patent and that said Letters Patent is hereby corrected as shown below:

Column 2, line 56, after "test" delete "chipterface" and insert -- chips irrespective of the number of pins in the package. Moreover, a single tester can be built that will test a multitude of subsystems with different numbers of interface signals, different physical organizations (board geometries, chip pin counts, etc.), again because the testing interface --.

Signed and Sealed this

Twenty-first Day of January 1986

[SEAL]

Attest:

DONALD J. QUIGG

Attesting Officer

Commissioner of Patents and Trademarks